(No Model.)

J. A. VOLTZ.
BACK PRESSURE TRAP FOR SEWER PIPES.

No. 417,452. Patented Dec. 17, 1889.

Witnesses:
Harry T. Jones.
Robert H. Millar.

Inventor:
John A. Voltz

UNITED STATES PATENT OFFICE.

JOHN A. VOLTZ, OF CHICAGO, ILLINOIS.

BACK-PRESSURE TRAP FOR SEWER-PIPES.

SPECIFICATION forming part of Letters Patent No. 417,452, dated December 17, 1889.

Application filed September 12, 1889. Serial No. 323,781. (No model.)

*To all whom it may concern:*

Be it known that I, JOHN A. VOLTZ, residing at Chicago, in the county of Cook and State of Illinois, and a citizen of the United States, have invented a new and useful Improvement in Back-Pressure Traps for Sewer-Pipes, of which the following is a specification, reference being had to the accompanying drawings, in which—

Figure 1:
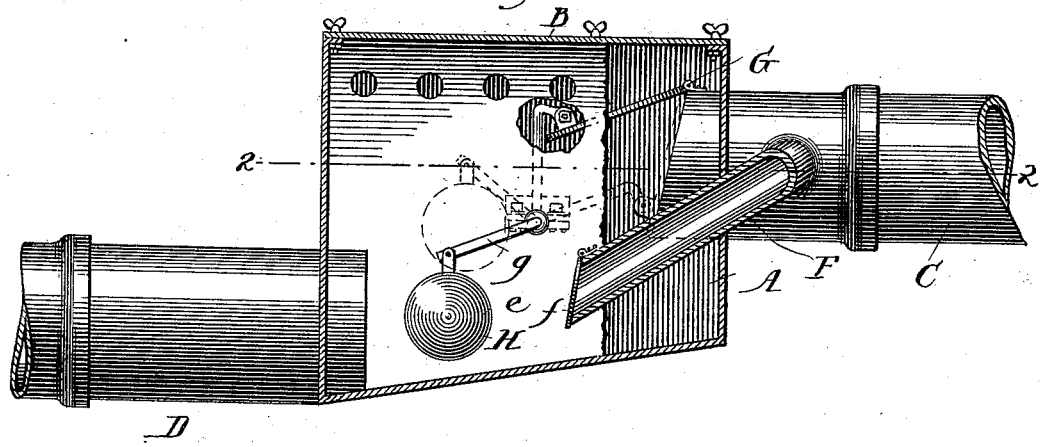
Figure 2:
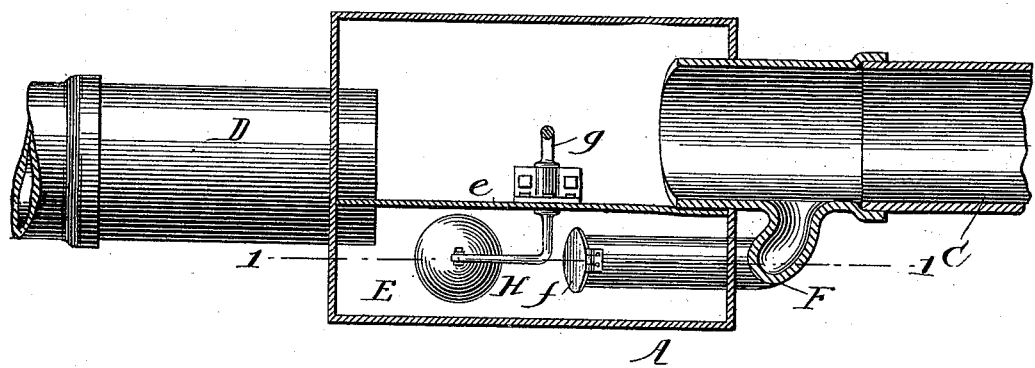

Figure 1 is a vertical section on line 1 1 of Fig. 2. Fig. 2 is a horizontal section on line 2 2 of Fig. 1.

The object of my invention is to provide an improved trap to prevent the passage of water or sewage backward through a sewer-pipe whenever there is a back-pressure in the pipe caused from a flushing of the sewer, or by gas, by an unusual flow of water in the sewer, or other causes, which I accomplish as illustrated in the drawings and as hereinafter described.

That which I claim as new will be pointed out in the claim.

In the drawings, A represents a casing for the trap. This casing may be made square, rounded, or in any suitable form desired.

B is a cover which is screwed to the casing by thumb-screws, so that it may be readily removed.

C is an inlet-pipe.

D is an outlet-pipe.

E is a chamber formed in the casing A by a partition $e$.

F is a small flush-pipe which is connected at its outer end with the pipe C a distance above its lower side, as shown in Fig. 1, and with the chamber E at its inner end, as shown in both figures. The inner end of this pipe F is closed by a valve $f$, which opens inward.

G is a valve adapted to close the inner end of the pipe C.

H is a float located in the chamber E and connected with the valve G by a lever $g$, which is pivoted in the partition $e$. This lever E may be made in any suitable form, according to the relation of the valve G and float H, so as to close the valve G whenever water rises in the chamber E and raises the float. The pipe D opens into both the chamber and the main portion of the casing A. When there is no back-pressure in the pipe D, the float H will hold the valve G open, as shown by the full lines in Fig. 1, and all water and sewage will flow through the casing A into and through the pipe D. The flush-pipe F is such a distance above the lower side of the pipe C that no water will flow through such pipe. When from any cause there is a back-pressure in the pipe D, the water will rise in the casing A and cause the float H to rise in the chamber E, as indicated by dotted lines in Fig. 1, thereby closing the valve G and preventing the passage of any water into the pipe D. The pipe F is closed by the valve $f$. The pipe C is to be such a distance above the float H and pipe D that it will be closed by the rising of the float before any back-water or sewage rises and flows into it. Such a difference in the height of the parts may be made by inclining the bottom of the casing, as shown. When the back-pressure ceases and the water flows from the casing A, enough sediment may have been deposited beneath the float to prevent the float from returning to its normal position. In such case the valve G will be held closed by the float and prevent the passage of water from the pipe C until the water rises high enough in the pipe C to flow out to the flush-pipe F. The water flowing through the pipe F will flush the chamber E and carry away the deposited sediment, thereby again allowing the float to descend to its normal position.

When desired, the cover B may be removed and the trap cleaned, which sometimes may be necessary. The form of the casing A, however, should be such that the water flowing through it will keep it clean. The operating parts all being located within the casing, the trap may be readily cleaned and is very convenient in form.

The trap may be located wherever it is desired to prevent the backward flow of water and sewage.

I am aware that floats have been used to control valves to prevent water from flowing backward through pipes, and I do not claim such construction, broadly; but What I do claim as new, and desire to secure by Letters Patent, is—

5. In a back-pressure trap, the combination of a flush-pipe F with an inlet-pipe C, chamber E, outlet-pipe D, valve G, and float H, adapted to open and close the valve G, substantially as specified.

JOHN A. VOLTZ.

Witnesses:
HARRY T. JONES,
ROBERT A. MILLAR.